United States Patent
Armitage et al.

(10) Patent No.: US 6,269,530 B1
(45) Date of Patent: Aug. 7, 2001

(54) ELECTROMAGNETIC FLOW SENSOR AND ASSEMBLY METHOD

(75) Inventors: Michael David Armitage; Ann Jennifer Cooper, both of Stroud; David Frank Marlow, Stonehouse; Roger Bryson Turner; Raymond Whitehead, both of Stroud, all of (GB)

(73) Assignee: ABB Kent-Taylor Limited, Gloucestershire (GB)

( * ) Notice: Subject to any disclaimer, the term of this patent is extended or adjusted under 35 U.S.C. 154(b) by 0 days.

(21) Appl. No.: 09/126,949

(22) Filed: Jul. 31, 1998

(30) Foreign Application Priority Data

Aug. 1, 1997 (GB) .................................. 9716392

(51) Int. Cl.$^7$ .................................................. H01F 41/00
(52) U.S. Cl. ........................................ 29/602.1; 73/861.11
(58) Field of Search ................... 29/602.1; 73/861.11, 73/861.12

(56) References Cited

U.S. PATENT DOCUMENTS

| | | |
|---|---|---|
| 3,608,375 | 9/1971 | Cushing . |
| 3,924,466 | 12/1975 | Medlar . |
| 4,454,766 | 6/1984 | Reinhold et al. . |
| 4,507,975 | 4/1985 | Bittner et al. . |
| 4,522,073 | 6/1985 | Knaak . |
| 4,716,649 | 1/1988 | Bittner et al. . |

FOREIGN PATENT DOCUMENTS

| | | |
|---|---|---|
| 1 951 919 | 4/1971 | (DE) . |
| 197 08 857 | 2/1998 | (DE) . |
| 1221963 | 2/1971 | (GB) . |
| 2160658 | 12/1985 | (GB) . |
| 2160982 | 1/1986 | (GB) . |
| 2289514 | 11/1995 | (GB) . |
| 2 314 902 | 1/1998 | (GB) . |

*Primary Examiner*—Carl E. Hall
(74) *Attorney, Agent, or Firm*—Sterne, Kessler, Goldstein & Fox PLLC

(57) ABSTRACT

A method of assembling an electromagnetic flow sensor which includes a length of tubular material (referred to herein as a "spool") (1) intended to be fitted with a tubular insert (2) that is anchored relative to the spool once the spool is fitted into the pipeline. Sealing is preferably achieved by means of extensions of the insert material (typically elastomer) intended to be trapped between end fittings of the spool and abutting ends of the pipeline and secured when the spool is connected in fluid-tight manner to the pipeline. The insert is preferably reinforced against deformation under the application of pressure, and this can be achieved by incorporating one or more bands (4) of suitable material into the insert.

13 Claims, 1 Drawing Sheet

ELECTROMAGNETIC FLOW SENSOR AND ASSEMBLY METHOD

Figure 1:
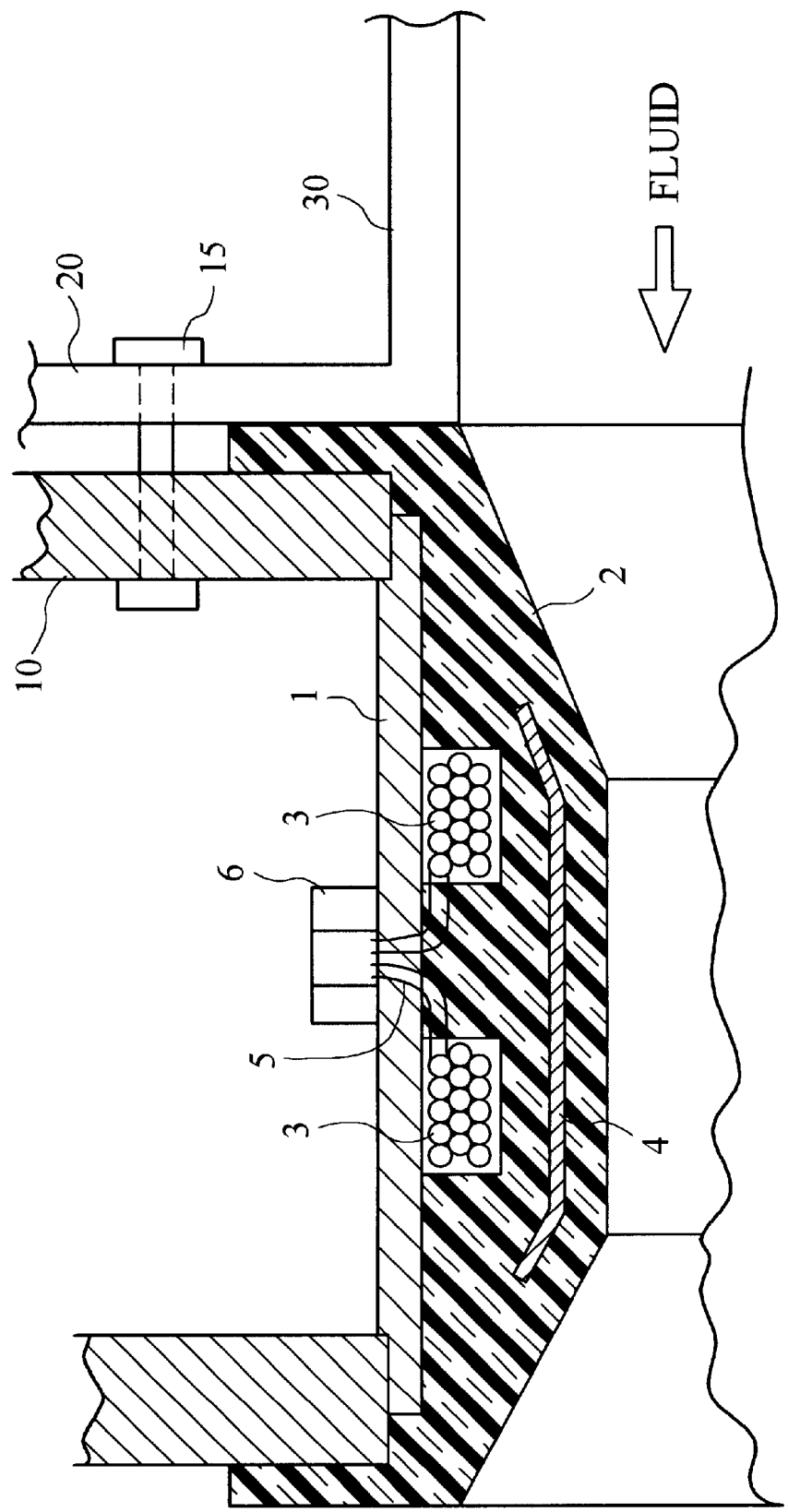

This invention relates to electromagnetic flow sensors and to methods of assembling such sensors into lengths of tubular material for insertion into pipe lines and the like through which fluid flows so as to sense the rate of passage of the fluid through the pipe.

Such sensors, and their modes of operation, are well known, and form of themselves no part of this invention. Electromagnetic flow sensing is a mature and robust technology which works reliably once installed into a pipeline or the like. Difficulty and expense is, however, encountered at the point of assembling the meter components into a portion of pipeline, since a wide variety of pipeline configurations exists and it is generally necessary, to construct sensor assemblies bespoke to fit the various structures.

It is an object of this invention to enable these difficulties to be overcome or reduced by providing a sensor assembly which can be accommodated within a number of pipelines of different configurations and/or dimensions. The invention also aims to provide a method of assembling the sensor into a length of tubular material intended for insertion as a series element into a pipeline. The length of tubular material will typically be provided with flanges for securing the insert to flanges on an adjoining section of pipeline, but other couplings may be provided, or the insert may be intended to be joined without flanges; such lengths of tubular material, whether provided with flanges or couplings or not, will hereinafter be referred to for brevity and convenience as a "spool". The spool is usually made of material of similar strength to the pipeline, though this need not necessarily be the case, but is often different material to the pipeline; the pipeline may be carbon steel, and the spool may be a non-magnetic material such as stainless steel.

According to one aspect of the invention there is provided a method of assembling an electromagnetic flow sensor into a spool (as hereinbefore defined) comprising the steps of forming a tubular insert of non-magnetic material, having an electrically insulating interior carrying sensing electrodes, assembling said insert into the spool to provide a reduced bore within the spool and securing the insert to the spool.

In this way, assembly is simplified. A further advantage is that the reduced bore provides increased flow rate, which can improve accuracy of sensing.

The insert will preferably also carry means for generating a magnetic flux, for example electromagnetic coils of the sensor; this can further simplify assembly.

Securing the insert to the spool preferably includes anchoring the insert to the spool to inhibit displacement of the insert by fluid and sealing the insert to the spool to inhibit fluid leakage from the bore defined by the insert. Both functions may advantageously be achieved by securing ends of the insert to the spool.

At least a portion of the insert is preferably resiliently deformable, preferably at least sealing portions at either end of the insert. Assembling the insert into the spool may comprise deforming at least a portion of the insert; this facilitates sliding of the insert into the spool.

The insert may be formed of elastomeric material, such as rubber (preferably synthetic rubber), or may be formed of a composite material.

From another aspect, the invention provides an electromagnetic flow sensor assembly comprising a spool (as hereinbefore defined) containing a tubular insert formed of non-magnetic material incorporating sensing electrodes and having means for securing the insert to the spool when the spool is operationally connected into a pipeline, the interior of the insert being electrically insulating and defining a bore of lesser diameter than that of the spool.

The portion of the insert which comprises the section in which flow measurements are made is preferably substantially inelastic, so that the cross-sectional area remains substantially constant within the limits of measurement accuracy with variations in fluid pressure, velocity and temperature expected in use. However, resilient materials may be better sealed to a spool. In a preferred construction, the insert comprises a substantially resilient tubular body having one or more reinforcing components incorporated therein. The components are arranged to resist deformation of a metering section, typically at or near the centre of the insert, under the application of pressure. Such components may be constituted by bands of metallic material, such as steel, or by filamentary material such as glass fibre, nylon or rayon. Moreover, the reinforcing component or components may be self-contained, or may cooperate with other support members incorporated into the insert.

In a preferred embodiment of the invention, the anchorage of the insert is achieved, or at least contributed to, and sealing is effected by means of extensions of resilient material intended to be trapped between the spool and the abutting ends of the pipeline into which it is to be fitted, and secured there when the flanges or other line fittings and connections are tightened to render the construction fluid-tight. Instead or in addition, the anchoring may be achieved by means of connections or couplings to the spool wall, advantageously in the vicinity of the electrical connections to sensing electrodes or the electromagnetic coils of the sensor. These may be used to secure the insert to the spool at a point intermediate the ends of the spool.

Particularly if an end of the insert is not dimensioned to be sealingly trapped between the spool and an adjacent portion of pipeline, the insert may have (additional) sealing means for effecting a fluid tight seal between the insert and the wall of the spool. This can ensure that the insert provides a fluid-tight cavity within the pipeline, preventing fluid reaching the coils or other sensing elements or by-passing the metering bore.

Instead of or in addition to the use of reinforcing components to resist deformation under fluid pressure, means may be provided for monitoring such deformation or the pressure causing it and compensating the sensor output to allow for its effects, for example by taking calibrational readings in a test environment and incorporating the results into an electronic "look-up table" against which readings derived during normal usage of the sensor can be automatically compensated, provided that sufficient operational parameters can be detected.

In order that the invention may be clearly understood and readily carried into effect, one embodiment thereof will now be described, by way of example only, with reference to the accompanying drawing, the single figure of which shows a schematic cross-sectional view through a sensor assembly according to an example of the invention.

Referring now to the drawing, a spool comprising a length 1 of tubular material, for example stainless steel, of similar strength to that of a pipeline into which it is intended for insertion as a series element (typically carbon steel), contains a resilient, tubular insert 2 of electrically insulative, nonmagnetic material which in this example is an elastomer or synthetic rubber. Other materials can be used and, in particular, the material need not be homogeneous.

The material of the insert 2 supports electromagnetic coils 3 which are of any convenient form as used or usable in electromagnetic flow meters and can be entirely conventional. The insert also has electrode means, normally at least two electrodes, (not shown) for sensing the potential developed across a fluid flowing through the insert, and may contain an earthing electrode for coupling to the pipeline. The insert may also include means for measuring the conductivity of the fluid.

Also disposed within, and carried by, the material of insert 2 is a band 4 of metal, for example steel, or of filamentary material such as glass fibre, nylon or rayon, which (depending on the material and any tendency to interact with the electromagnetic fields associated with the coils 3) is disposed close to the inner surface of the insert to resist deformation of the insert in response to fluid pressures that may be encountered in operation. In alternative embodiments, the reinforcement may be integrated with the magnetic return circuit for the coils 3. In general, multiple belts of similar or differing constructions can be used. Electrical cables generally shown at 5 communicate between the coils 3, the sensing electrodes and a connector block 6, mounted externally of the spool 1, which may also contain electrical circuitry including data storage and/or remotely addressable or signaling components.

In this example of the invention, the insert 2 is located within the spool 1 by means of extensions of the resilient material of insert 2 which protrude from the spool and are intended to be trapped between the spool and the abutting ends of the pipeline (30) to which the spool is to be fitted as a series element. Location is completed by the action of securing the spool by means of bolts 15 securing the flange 10 of the spool to a flange 20 of the adjacent portion of pipeline 30, the trapped ends of the insert serving as a sealing gasket, and also providing some anchorage for the insert. A tubular member (not shown) may be provided to surround and protect the cables 5 and, if so provided, may be used to effect secure anchoring of the insert 2 to the spool 1.

As mentioned above, the spool need not be secured by means of flanges. Where a flangeless coupling is intended, following the principles described in our UK patent application number 9613172.7, the insert is preferably secured by means of adhesive at some distance from the end of the spool, and a protective shroud is preferably provided to shield the lining of the insert.

As can be seen from the drawing, the surface of the insert 2 that will be exposed to the fluid flowing in the pipeline, and thus through the insert, is shaped to present a desired profile to the fluid whose flow is to be measured. In this example, the insert is shaped to form a throat of reduced diameter which exhibits advantage in that the flow velocity is increased locally to the coils, permitting measurements of increased accuracy to be made. The shaping of the insert need not be the same on the upstream and downstream sides of the spool.

In the above embodiment, the insert is made of material which can be deformed to allow insertion into the spool. In an alternative embodiment, the insert may be made from a material which is not substantially deformable, in which case at least one end must have an overall diameter less than that of the bore of the spool, to enable the insert to be inserted from one end of the spool. In such a case, sealing may be effected by one or more additional components, such as sealing rings.

It is possible to utilise calibration and electrical monitoring of flow parameters to detect and compensate for distortion of the insert 2, and such procedures can be used instead of, or in addition to, the provision of reinforcing bands such as 4. As mentioned previously, electronic look-up tables can be used in conventional manner for these purposes.

A meter constructed as described above has a reduced diameter measuring section, compared to the diameter of the pipe-line. This allows greater measurement accuracy to be achieved. The insert together with its sensing means and magnetic field generating equipment, if fitted, is a self-contained sub-assembly which is independent of the specific flange arrangement to be mated to. This construction allows greater flexibility within the process of manufacturing meters, which is of commercial benefit.

What is claimed is:

1. A method of assembling an electromagnetic flow sensor into a preformed spool having a bore, the method comprising the steps of preforming a substantially tubular insert of non-magnetic material having an electrically insulating interior and carrying sensing electrodes for sensing a potential developed in a fluid flowing through the insert, inserting the insert into the bore of the preformed spool so that said sensing electrodes lie within the bore of said spool and, subsequent to said inserting, securing the insert to the preformed spool.

2. A method according to claim 1 including the step of reinforcing the insert against deformation under the application of pressure.

3. A method according to claim 2 wherein the step of reinforcing said insert is effected by incorporating a band of reinforcing material into the material of said insert.

4. A method according to claim 3 wherein said band is formed of metallic material.

5. A method according to claim 2 wherein reinforcing is effected by incorporating a filamentary material in the material of the insert.

6. A method according to claim 1 wherein the step of securing said insert includes sealing the insert to the spool by means of portions of the material of said insert extending beyond the spool.

7. A method according to claim 6 including the steps of trapping said portions of the insert between matching fitments of said spool and abutting ends of pipework to which said spool is to be secured and securing said fitments to form a fluid-tight seal between the spool and the pipework.

8. A method according to claim 1 wherein securing the insert into the spool includes anchoring the insert to the spool at a point intermediate the ends of the spool.

9. A method according to claim 1 including sealing portions of the insert to the spool.

10. A method according to claim 1 including the step of shaping said insert to present a predetermined profile to fluid.

11. A method according to claim 10 wherein said profile comprises a throat of reduced diameter.

12. A method according to claim 1, wherein at least a portion of the insert is resilient, wherein said inserting step comprises resiliently deforming said portion of said insert to insert said portion into the bore of said spool.

13. A method according to claim 12, wherein the step of assembling the insert into the bore of the spool comprises deforming at least a portion of the insert.

* * * * *